(12) United States Patent
Lin et al.

(10) Patent No.: US 10,382,600 B2
(45) Date of Patent: Aug. 13, 2019

(54) FOLDABLE TERMINAL

(71) Applicant: GUANGDONG OPPO MOBILE TELECOMMUNICATIONS CORP., LTD., Dongguan, Guangdong (CN)

(72) Inventors: Yugui Lin, Guangdong (CN); Maozhao Huang, Guangdong (CN)

(73) Assignee: GUANGDONG OPPO MOBILE TELECOMMUNICATIONS CORP. LTD., Dongguan, Guangdong (CN)

( * ) Notice: Subject to any disclaimer, the term of this patent is extended or adjusted under 35 U.S.C. 154(b) by 0 days.

(21) Appl. No.: 15/779,052

(22) PCT Filed: Dec. 29, 2016

(86) PCT No.: PCT/CN2016/113041
§ 371 (c)(1),
(2) Date: May 24, 2018

(87) PCT Pub. No.: WO2017/114466
PCT Pub. Date: Jul. 6, 2017

(65) Prior Publication Data
US 2018/0343330 A1    Nov. 29, 2018

(30) Foreign Application Priority Data

Dec. 29, 2015  (CN) .......................... 2015 1 1026104

(51) Int. Cl.
*H04M 1/02*    (2006.01)
(52) U.S. Cl.
CPC ....... *H04M 1/0216* (2013.01); *H04M 1/0268* (2013.01)

(58) Field of Classification Search
CPC .......................... H04M 1/0268; H04M 1/0216
See application file for complete search history.

(56) References Cited

U.S. PATENT DOCUMENTS

| 6,377,324 | B1 | 4/2002 | Katsura |
| 8,005,521 | B2 * | 8/2011 | Cho .................... H04M 1/0216 379/433.13 |
| 8,958,201 | B2 * | 2/2015 | Leung .................. G06F 1/1626 361/679.27 |
| 2003/0118179 | A1 | 6/2003 | Barnett et al. |

(Continued)

FOREIGN PATENT DOCUMENTS

| CN | 101120295 A | 2/2008 |
| CN | 103294113 A | 9/2013 |

(Continued)

OTHER PUBLICATIONS

PCT/CN2016/113041 International Search Report and Written Opinion dated Mar. 21, 2017, 12 pages.

(Continued)

*Primary Examiner* — Marisol Figueroa
(74) *Attorney, Agent, or Firm* — Lathrop Gage LLP

(57) ABSTRACT

The present disclosure provides a foldable terminal, including an elastic sheet. The elastic sheet provides an elastic force in a state, so as to keep the housing in a folded state, and the elastic sheet provides another elastic force in another state, so as to keep the housing in an unfolded state. When the foldable terminal is in the unfolded state, the elastic sheet supports an inner side of the flexible screen.

18 Claims, 2 Drawing Sheets

(56) References Cited

U.S. PATENT DOCUMENTS

2008/0300031 A1   12/2008   Cho et al.
2011/0286157 A1   11/2011   Ma
2013/0021762 A1   1/2013    Van Dijk et al.

FOREIGN PATENT DOCUMENTS

| | | |
|---|---|---|
| CN | 103914273 A | 7/2014 |
| CN | 104506688 A | 4/2015 |
| CN | 204331666 U | 5/2015 |
| CN | 104916230 A | 9/2015 |
| CN | 105611006 A | 5/2016 |
| EP | 2511789 A1 | 10/2012 |
| EP | 2953268 A1 | 12/2015 |
| JP | 2005155896 A | 6/2005 |
| JP | 2006072115 A | 3/2006 |
| KR | 20130083945 A | 7/2013 |
| KR | 20140049911 A | 4/2014 |

OTHER PUBLICATIONS

PCT/CN2016/113041 English translation of International Search Report dated Mar. 21, 2017, 2 pages.
PCT/CN2016/113041 English translation of Written Opinion dated Mar. 21, 2017, 5 pages.
European Patent Application No. 16881255.0 extended Search and Opinion dated Aug. 10, 2018, 10 pages.
Chinese Patent Application No. 201511026104.0 Office Action dated Dec. 20, 2017, 3 pages.
Chinese Patent Application No. 201511026104.0 Office Action dated Nov. 3, 2017, 3 pages.
Chinese Patent Application No. 201511026104.0 English translation of Office Action dated Dec. 20, 2017, 4 pages.
Chinese Patent Application No. 201511026104.0 English translation of Office Action dated Nov. 3, 2017, 5 pages.
European Patent Application No. 16881255.0 Office Action dated Jan. 23, 2019, 7 pages.
Japanese Patent Application No. 2018-529107 English translation of Office Action dated May 21, 2019, 7 pages.
Japanese Patent Application No. 2018-529107 Office Action dated May 21, 2019, 7 pages.

* cited by examiner

FOLDABLE TERMINAL

CROSS-REFERENCE TO RELATED APPLICATIONS

The present application is a U.S. National Phase application under 35 USC § 371 of International Patent Application No. PCT/CN2016/113041, filed on Dec. 29, 2016, which claims priority to and benefits of Chinese Patent Application Serial No. 201511026104.0, filed with the State Intellectual Property Office of P. R. China on Dec. 29, 2015. The entire contents of the before-mentioned patent applications are incorporated by reference as part of the disclosure of this U.S. application.

FIELD

The present disclosure relates to electronic products, and more particularly to a foldable terminal.

BACKGROUND

A flexible screen is a tendency of mobile electronic products in future. The flexible screen in the prior art is secured to a terminal body. For a terminal product which is repeatedly bent in use, the terminal product is generally divided into two parts to be folded once. The flexible screen is arranged at a folding inner side of the terminal product, and can be seen after the terminal product is unfolded.

For convenience of folding of the flexible screen, an accommodation space needs to be reserved at the inner side of the terminal product and in the middle of the terminal product, and thus a middle portion of the flexible screen can be received in the accommodation space after being folded. When the terminal product is unfolded, the flexible screen is spread to a flat shape, the middle portion of the flexible screen is hung in the air due to the accommodation space and is not connected to or supported by other internal structural members of the terminal product, such that when the terminal product is in a unfolded state, a user has a poor press experience with respect to the middle portion of the flexible screen.

SUMMARY

The present disclosure seeks to solve a technical problem by providing a foldable terminal, and when the foldable terminal is in an unfolded state, a middle portion of the foldable terminal is supported, so as to improve press experience of a user.

To solve the above technical problem, embodiments of the present disclosure provide a foldable terminal. The foldable terminal includes a housing and an elastic sheet, and the elastic sheet is disposed at an inner side of the housing and in the middle of the housing. When the foldable terminal is in a folded state, a middle portion of the elastic sheet protrudes towards the housing. When the foldable terminal is in an unfolded state, the middle portion of the elastic sheet deforms and protrudes in a direction opposite to the direction in which the middle portion of the elastic sheet protrudes when the foldable terminal is in the folded state.

The present disclosure also provides another foldable terminal, including a housing, an elastic sheet and a flexible screen. The housing includes two shells and a bending portion which is bendable and deformable, and the bending portion is connected between the two shells. The elastic sheet is sandwiched between the housing and the flexible screen, two ends of the elastic sheet are disposed in correspondence to the two shells, and a middle portion of the elastic sheet is disposed in correspondence to the bending portion. The elastic sheet is configured to provide an elastic force in a state, so as to keep the housing in a folded state, and the elastic sheet is configured to provide another elastic force in another state, so as to keep the housing in an unfolded state. When the foldable terminal is in the unfolded state, the elastic sheet supports an inner side of the flexible screen.

The present disclosure further provides another foldable terminal, including two bodies, an elastic sheet and a flexible screen. Two ends of the elastic sheet are fixedly connected with the two bodies correspondingly, and two ends of the flexible screen are connected to the two bodies correspondingly. The elastic sheet is configured to provide an elastic force in a state, so as to keep the two bodies in a folded state, and the elastic sheet is configured to provide another elastic force in another state, so as to keep the two bodies in an unfolded state. When the foldable terminal is in the unfolded state, the elastic sheet supports the flexible screen.

DETAILED DESCRIPTION

Figure 1:
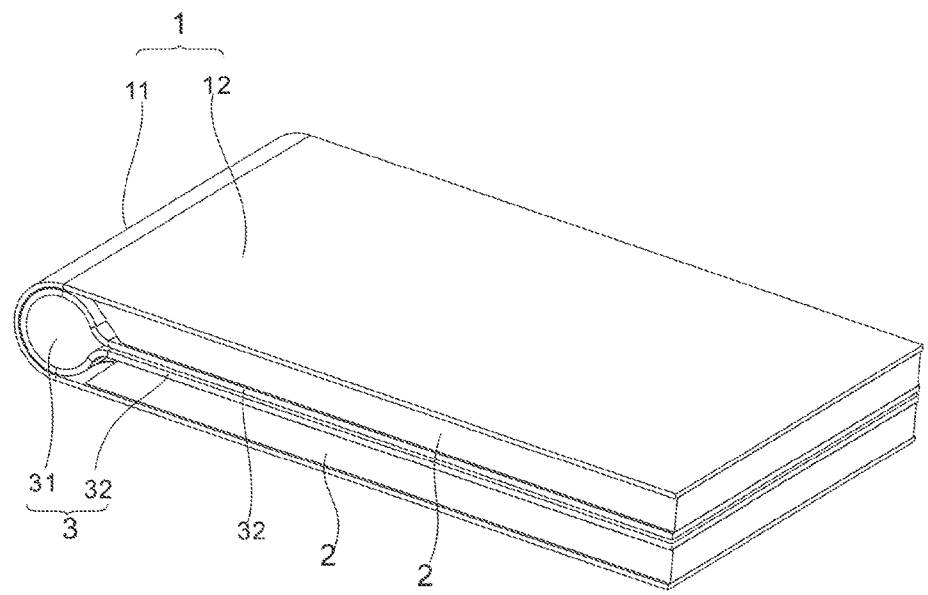
FIG. 1 is a perspective view of a foldable terminal provided by an embodiment of the present disclosure, in which the foldable terminal is in a folded state.

Technical solutions in embodiments of the present disclosure will be described clearly and completely herein with reference to accompanying drawings of the embodiments of the present disclosure. Obviously, the described embodiments are just a part of embodiments of the present disclosure, rather than all the embodiments. Based on the embodiments in the present disclosure, all the other embodiments acquired by those skilled in the art without creative labor belong to the scope of protection of the present disclosure.

As illustrated in FIGS. 1-4, a foldable terminal having a flexible screen is provided according to an embodiment of the present disclosure. The terminal can be any terminal device, such as a tablet PC, a mobile phone, an electronic reader, a remote control, a personal computer (PC), a laptop, an on-board unit, a network television, a wearable device or the like.

As illustrated in FIGS. 1-4, the foldable terminal having the flexible screen includes a housing 1, two bodies 2, a flexible screen 3 and an elastic sheet 4. The two bodies 2 each are fixed to the housing 1, the elastic sheet 4 is connected between the two bodies 2, and the flexible screen 3 is fixed to inner surfaces of the two bodies 2. When the two bodies 2 are folded or unfolded, the flexible screen 3 can be folded or unfolded accordingly.

The housing 1 defines an outer surface of the foldable terminal having the flexible screen. The housing 1 includes two shells 12 and a bending portion 11 which is bendable and deformable, and the bending portion 11 is connected between the two shells 12. The two bodies 2 are fixed to the two shells 12 correspondingly. That is, one of the two bodies 2 is fixed to one of the two shells 12, and the other one of the two bodies 2 is fixed to the other one of the two shells 12. The two shells 12 can be integrally formed with the bending portion 11, so as to improve strength of connection structures. The housing 1 can be made from a bendable material such as silicone, leather, cloth, thin PC sheet or the like. In some embodiments, the housing 1 itself is a tabulate flat straight structure in a nature state, i.e., the housing 1 is a tabular flat straight structure in an unfolded state, and an included angle between the two shells 12 is 180 degrees. The housing 1 can be bent under the action of an external force, such that the included angle between the two shells 12 is 0 degree, and thereby the housing 1 is transformed into a folded state.

In some embodiments, the whole housing 1 is made from a bendable and deformable material. Herein, in other embodiments, it is possible that only the bending portion 11 is made from the bendable and deformable material, the two shells 12 are made from other materials, and two ends of the bending portion 11 are fixedly connected with the two shells 12 correspondingly. That is, one of the two ends of the bending portion 11 is fixedly connected to one of the two shells 12, and the other one of the two ends of the bending portion 11 is fixed connected to the other one of the two shells 12.

The two bodies 2 are fixed to the two shells 12 correspondingly. That is, one of the two bodies 2 is fixed to one of the two shells 12, and the other one of the two bodies 2 is fixed to the other one of the two shells 2. The two bodies 2 each are provided with components therein, such as a built-in circuit board, a battery or the like. Certainly, in other embodiments, it is possible that only one body 2 is provided with the battery and the circuit board therein, and the one body 2 is electrically connected with the other body 2, so as to achieve power supply and signal transmission for the other body 2. A flexible circuit board (not illustrated in the drawings) is connected between the two bodies 2, and hence the electrical connection between the two bodies 2 can be achieved through the flexible circuit board.

The flexible circuit board is fixed to the bending portion 11 and can be bent and unfolded along with the bending portion 11, such that it is convenient for the structure arrangement of the flexible circuit board, thereby avoiding the flexible circuit board from interfering with other internal structural members.

More specifically, the flexible circuit board can be embedded in the bending portion 11, and two ends of the flexible circuit board can be detachably fixedly connected with the two bodies 2 through an electric connector correspondingly. That is, one of the two ends of the flexible circuit board can be detachably fixedly connected with one of the two bodies 2 through an electric connector, and the other one of two ends of the flexible circuit board can be detachably fixedly connected with the other one of the two bodies 2 through another electric connector. Since the flexible circuit board is embedded in the bending portion 11, an occupation space of the flexible circuit board can be reduced, the amount of parts in the terminal is decreased, and the flexible circuit board is effectively prevented from interfering with other internal structural members. Herein, in other embodiments, the flexible circuit board can also be close fitted with and fixed to an inner surface of the bending portion 11, and the flexible circuit board can also be close fitted with and fixed to an inner surface of the flexible screen 3 or a surface of the elastic sheet 4.

The flexible screen 3 is located at an inner surface of the foldable terminal having the flexible screen. The flexible screen 3 includes two fixed areas 32 and a bending area 31. The two fixed areas 32 are fixed to the two bodies 2 correspondingly. That is, one of the two fixed areas 32 is fixed to one of the two bodies 2, and the other one of the two fixed areas 32 is fixed to the other one of the two bodies 2. The bending area 31 is connected between the two fixed areas 32, and the three areas are integrally formed. The bending area 31 is seamlessly connected with the fixed areas 32, so as to ensure integrality of the flexible screen 3 and hence ensure a visual effect of display.

The flexible screen 3 has a flexible display screen and a touch layer laminated on the display screen. It is possible to display information by means of the display screen, and to achieve a touch control on the terminal by means of the touch layer.

Figure 5:
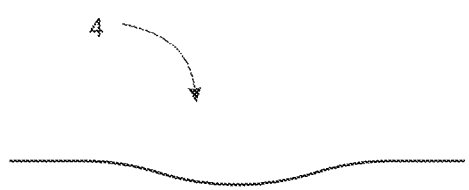
FIG. 5 is a schematic view of an elastic sheet in the foldable terminal of FIG. 1, in which the elastic sheet is in a nature state.
Figure 6:
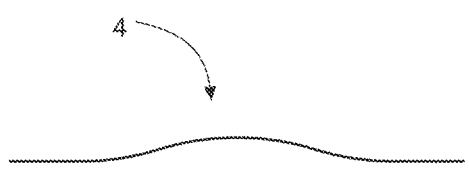
FIG. 6 is a schematic view of the elastic sheet after being deformed under force in FIG. 5.

The elastic sheet 4 is bow-shaped, and two ends of the elastic sheet 4 are fixedly connected to the two bodies 2 correspondingly. That is, one of the two ends of the elastic sheet 4 is fixedly connected to one of the two bodies 2, and the other one of the two ends of the elastic sheet 4 is fixedly connected to the other one of the two bodies 2. The elastic sheet 4 is sandwiched between the bending portion 11 and the bending area 31. The elastic sheet 4 can be an elastic material such as a stainless steel sheet, a beryllium copper sheet or a latten. As illustrated in FIG. 5, the elastic sheet 4 has a bow shape in a nature state. Due to shape characteristics and internal stress of the elastic sheet 4, when a protruding arc portion of the elastic sheet 4 in the middle of the elastic sheet 4 is exposed to an external force, the arc portion in the middle of the elastic sheet 4 can be bounced to the other side, thereby protruding in the other direction, as illustrated in FIG. 6.

Figure 2:
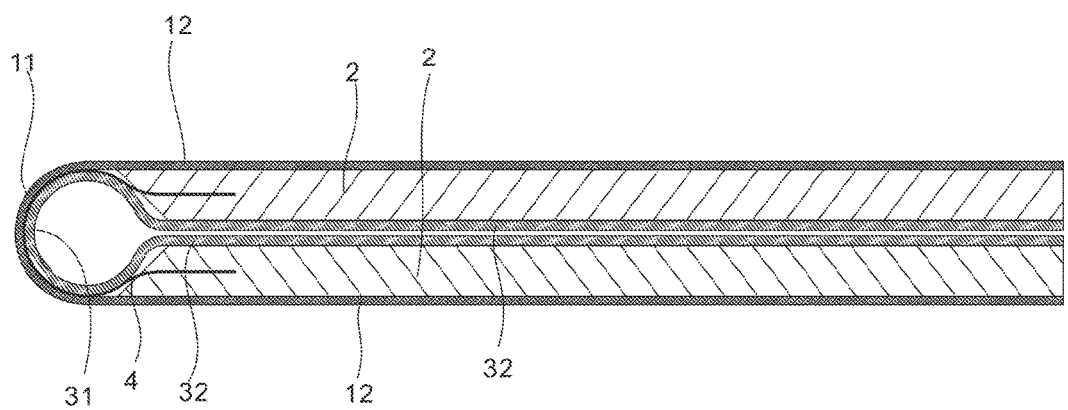
FIG. 2 is a sectional view of the foldable terminal in FIG. 1, in which the foldable terminal is in the folded state.

As illustrated in FIGS. 1 and 2, when the foldable terminal having the flexible screen is in the folded state, a middle portion of the elastic sheet 4 protrudes towards the housing 1; when the foldable terminal having the flexible screen is in the unfolded state, the middle portion of the elastic sheet 4 is reversely deformed and protrudes towards the bending area 31, so as to support an inner side of the bending area 31.

Figure 3:
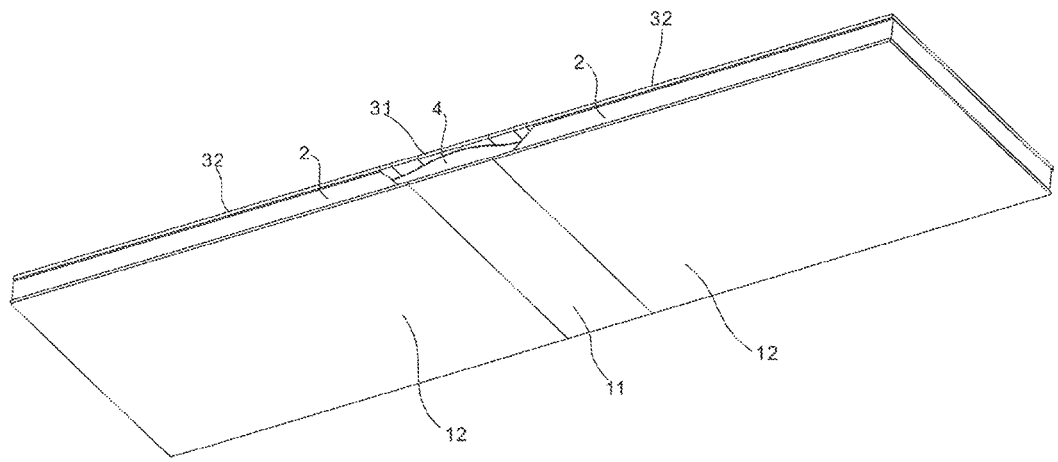
FIG. 3 is a perspective view of the foldable terminal in FIG. 1, in which the foldable terminal in an unfolded state.
Figure 4:
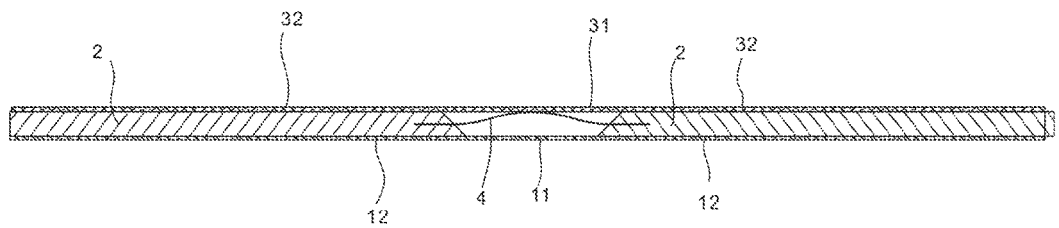
FIG. 4 is a sectional view of the foldable terminal in FIG. 1, in which the foldable terminal is in an unfolded state.

As illustrated in FIGS. 3 and 4, after the foldable terminal having the flexible screen is unfolded, the whole flexible screen 3 is flat, and the bending area 31 of the flexible screen 3 can be supported by the middle portion of the elastic sheet 4, thereby solving the technical problem that when the flexible screen 3 is unfolded, a middle portion of the flexible screen 3, i.e., the bending area 31 is hung in the air, and a poor press experience is caused. After the foldable terminal having the flexible screen is folded, the middle portion of the elastic sheet 4 protrudes towards the housing 1, thereby leaving space for the bending area 31 of the flexible screen 3 to bend, and hence avoiding the bending area 31 from being damaged due to compression.

An end of the elastic sheet 4 is fixedly connected to a middle portion of the body 2 in a thickness direction of the body 2. The arc portion in the middle of the elastic sheet 4 has a roughly equal protrusion height when the terminal is in the folded state or the unfolded state, such that an overall flatness of the flexible screen 3 can be ensured after the foldable terminal having the flexible screen is unfolded, thus avoiding the bending area 31 from being recessed or raised. Also, after the foldable terminal is folded, the arc portion in the middle of the elastic sheet 4 can abut against an inner side of the bending portion 11 of the housing 1, so as to make full use of space between the bending area 31 and the bending portion 11.

A middle portion of the bending area 31 is fixedly connected with a middle portion of the elastic sheet 4. The middle portion of the bending area 31 can be fixedly connected with the middle portion of the elastic sheet 4 by means of adhesion. After the middle portions of the bending area 31 and the elastic sheet 4 are fixed to each other, when the foldable terminal having the flexible screen is folded, the middle portion of the elastic sheet 4 is deformed and protrudes towards the housing 1, thereby driving the bending area 31 to bend and be deformed, which facilitates the bending of the bending area 31, and avoids the situation that the bending area 31 does not bend normally and gets damaged due to compression, and thus the normal use is affected.

When the foldable terminal is in the folded state, the bending area 31 is bent into a circular arc shape, which facilitates recovering the bending area 31 to the flat shape, and avoids the bending area 31 from getting damaged due to an excessive bending.

The elastic sheet 4 is provided with a flexible spacer (not illustrated in the drawings), and the flexible spacer is sandwiched between the elastic sheet 4 and the bending area 31 of the flexible screen 3. The flexible spacer facilitates the support for the bending area 31, and avoids a rigid support of the elastic sheet 4 from causing damage to the bending area 31, so as not to affect the normal display of the flexible screen 3.

The above embodiments do not constitute a limitation to the protection scope of the technical solution. Any modifications, equivalents and improvements within the spirit and scope of the above embodiments should be contained in the protection scope of the technical solution.

What is claimed is:

1. A foldable terminal, comprising a housing and an elastic sheet, the elastic sheet being disposed at an inner side of the housing and in the middle of the housing,
   wherein when the foldable terminal is in a folded state, a middle portion of the elastic sheet protrudes towards the housing; when the foldable terminal is in a unfolded state, the middle portion of the elastic sheet deforms and protrudes in a direction opposite to the direction in which the middle portion of the elastic sheet protrudes when the foldable terminal is in the folded state,
   wherein when the foldable terminal is in the folded state or the unfolded state, the middle portion of the elastic sheet has an arc shape, and the arc middle portion of the elastic sheet has an equal height when the foldable terminal is in the folded state or the unfolded state.

2. The foldable terminal according to claim 1, wherein the elastic sheet is bow-shaped.

3. The foldable terminal according to claim 1, wherein the housing comprises two shells and a bending portion which is bendable and deformable, and the bending portion is connected between the two shells; two ends of the elastic sheet are arranged in correspondence to the two shells, and the middle portion of the elastic sheet is arranged in correspondence to the bending portion.

4. The foldable terminal according to claim 3, wherein when the foldable terminal is in the folded state, and the middle portion of the elastic sheet abuts against an inner side of the bending portion.

5. The foldable terminal according to claim 3, wherein the two shells and the bending portion are integrally formed, and the whole housing is made from a bendable and deformable material.

6. The foldable terminal according to claim 1, wherein the foldable terminal further comprises two bodies, and the two bodies are fixed to the two shells correspondingly; two ends of the elastic sheet are fixedly connected to the two bodies correspondingly.

7. The foldable terminal according to claim 6, wherein the end of the elastic sheet is fixedly connected to a middle portion of the body in a thickness direction of the body.

8. The foldable terminal according to claim 6, wherein the foldable terminal further comprises a flexible screen, and two ends of the flexible screen are fixed to the two bodies correspondingly; the elastic sheet is sandwiched between the flexible screen and the housing; when the foldable terminal is in the unfolded state, the elastic sheet supports an inner side of the flexible screen.

9. The foldable terminal according to claim 8, wherein the flexible screen comprises two fixed areas and a bending area, the two fixed areas are fixed to the two bodies correspondingly, and the bending area is connected between the two fixed areas; the elastic sheet is sandwiched between the bending portion and the bending area; when the foldable terminal is in the unfolded state, the elastic sheet supports an inner side of the bending area.

10. The foldable terminal according to claim 9, wherein a middle portion of the bending area is fixedly connected with the middle portion of the elastic sheet.

11. The foldable terminal according to claim 9, wherein when the foldable terminal is in the folded state, the bending area is bent into a circular arc shape.

12. The foldable terminal according to claim 6, wherein a flexible circuit board is provided and connected between the two bodies.

13. The foldable terminal according to claim 12, wherein the flexible circuit board is fixed to the bending portion.

14. The foldable terminal according to claim 12, wherein the flexible circuit board is embedded in the bending portion.

15. A foldable terminal, comprising a housing, an elastic sheet and a flexible screen, wherein the housing comprises two shells and a bending portion which is bendable and deformable, and the bending portion is connected between the two shells; the elastic sheet is sandwiched between the housing and the flexible screen, two ends of the elastic sheet are disposed in correspondence to the two shells, and a middle portion of the elastic sheet is disposed in correspondence to the bending portion; the elastic sheet is configured to provide an elastic force in a state, so as to keep the housing in a folded state, and the elastic sheet is configured to provide another elastic force in another state, so as to keep the housing in a unfolded state; when the foldable terminal is in the unfolded state, the elastic sheet supports an inner side of the flexible screen,
   wherein when the foldable terminal is in the unfolded state, a middle portion of the elastic sheet protrudes towards the flexible screen; when the foldable terminal is in the folded state, the middle portion of the elastic sheet protrudes in a direction running away from the flexible screen,
   wherein when the foldable terminal is in the folded state or the unfolded state, the middle portion of the elastic sheet has an arc shape, and the arc middle portion of the elastic sheet has an equal height when the foldable terminal is in the folded state or the unfolded state.

16. The foldable terminal according to claim 15, wherein the foldable terminal further comprises two bodies, and the two bodies are fixed to the two shells correspondingly; two ends of the elastic sheet are fixedly connected to the two bodies correspondingly; two ends of the flexible screen are connected to the two bodies correspondingly.

17. A foldable terminal, comprising two bodies, an elastic sheet and a flexible screen, wherein two ends of the elastic sheet are fixedly connected with the two bodies correspondingly, and two ends of the flexible screen are connected to the two bodies correspondingly; the elastic sheet is configured to provide an elastic force in a state, so as to keep the two bodies in a folded state, and the elastic sheet is configured to provide another elastic force in another state, so as to keep the two bodies in a unfolded state; when the foldable terminal is in the unfolded state, the elastic sheet supports the flexible screen, wherein when the foldable terminal is in the unfolded state, a middle portion of the elastic sheet protrudes towards the flexible screen; when the foldable terminal is in the folded state, the middle portion of the elastic sheet protrudes in a direction running away from the flexible screen, wherein when the foldable terminal is in the folded state or the unfolded state, the middle portion of the elastic sheet has an arc shape, and the arc middle portion of the elastic sheet has an equal height when the foldable terminal is in the folded state or the unfolded state.

18. The foldable terminal according to claim 13, wherein the flexible circuit board is close fitted with and fixed to an inner surface of the bending portion.

\* \* \* \* \*